United States Patent [19]

Drake

[11] Patent Number: 5,101,885
[45] Date of Patent: Apr. 7, 1992

[54] HYDRAULIC FLUID RESERVOIR INCLUDING COOLING SYSTEM

[76] Inventor: Maurice D. Drake, 3751 Woodman, Troy, Mich. 48084

[21] Appl. No.: 377,639

[22] Filed: Jul. 10, 1989

[51] Int. Cl.⁵ ............................................. B01D 19/00
[52] U.S. Cl. .................................. 165/47; 184/104.1; 184/6.22; 60/912; 55/190; 55/195; 55/192; 210/188
[58] Field of Search ...................... 60/912; 165/35, 47; 137/338, 340, 574; 184/6.22, 104.1, 104.3; 210/188; 55/189, 190, 192, 195, 201

[56] References Cited

U.S. PATENT DOCUMENTS

| | | | |
|---|---|---|---|
| 2,188,801 | 1/1940 | Worth | 184/104.1 |
| 2,450,960 | 10/1948 | Heintz | 184/104.1 |
| 2,478,428 | 8/1949 | Shaw et al. | 184/104.1 |
| 3,976,124 | 8/1976 | Brown | 165/35 |
| 4,074,752 | 2/1978 | Schlosberg | 184/6.22 |
| 4,256,031 | 3/1981 | Ryan | 60/912 |
| 4,746,335 | 5/1988 | Reimann et al. | 55/190 |

FOREIGN PATENT DOCUMENTS

| | | | |
|---|---|---|---|
| 0047336 | 3/1982 | European Pat. Off. | 165/916 |
| 0127108 | 10/1980 | Japan | 55/201 |
| 222331 | 2/1943 | Netherlands | 184/6.22 |
| 376480 | 7/1932 | United Kingdom | 184/6.22 |
| 836923 | 6/1960 | United Kingdom | 55/182 |

*Primary Examiner*—John Ford
*Attorney, Agent, or Firm*—Gifford, Groh, Sprinkle, Patmore and Anderson

[57] ABSTRACT

A hydraulic fluid reservoir for a hydraulic power unit includes a built-in air to fluid heat exchanger. The reservoir includes a tank having a front wall, a back wall, two side walls, a top and a floor. Situated on the inner side of the back wall and parallel thereto is a vertical baffle plate which forms a narrow channel between the baffle plate and the inner surface of the back wall. Situated on the outer side of the same wall is a fan for cooling the outer wall surface by blowing air thereon. When heated hydraulic fluid is forced to flow into the channel at its lower end and circulates upward through the channel, the fluid transfers its heat to the cooler inner back wall surface. When the fluid flows out of the heat exchanger channel it still may have air and/or vapor bubbles in the fluid, the upward momentum of the aerated fluid forces the fluid to the fluid surface where the bubbles burst when they come in contact with atmospheric pressure. Fixed to the lower end of the vertical baffle and situated perpendicularly thereto is a horizontal baffle situated horizontally with respect to the floor. The horizontal baffle defines a hot fluid storage chamber below the baffle and a cool and de-aerated storage chamber above the baffle from which the pump draws fluid.

3 Claims, 1 Drawing Sheet

HYDRAULIC FLUID RESERVOIR INCLUDING COOLING SYSTEM

BACKGROUND OF THE INVENTION

I. Field of the Invention The present invention relates generally to hydraulic fluid reservoirs. More particularly, the present invention relates to a system for increasing the cooling capacity of hydraulic fluid reservoirs by building into a reservoir an air-to-fluid heat exchanger.

II. Description of the Relevant Art

Historically, the hydraulic tank has been used to store fluid, remove heat generated in the hydraulic system and provide de-aerating time for the hydraulic fluid.

If the fluid is not cooled properly, it can break down and/or cause other components in the hydraulic system to fail. Furthermore, if the fluid is not de-aerated properly the hydraulic pump is susceptible to cavitation damage and sure failure.

The hydraulic reservoir has been made large so that the air or vapor bubbles in the fluid returning to the reservoir would have time to float to the fluid surface and break before the aerated fluid could be recirculated by the pump. Additionally, the large reservoir walls were used to radiate the heat in the returning fluid to the atmosphere. However, the heat dissipation rate, or fluid cooling rate, is very slow because: first, the heat in the fluid is first dissipated by transferring it to a relatively large volume of fluid in the reservoir; second, the heat is then transferred to the reservoir walls by a relatively slow mixing or circulation rate that occurs within the reservoir; third, the dissipated heat is then transferred through the reservoir walls; and fourth, the outer wall surface transfers the heat to the atmosphere by radiation.

Because the current state-of-the-art reservoir is so lacking in its ability to remove heat from the fluid, the reservoir has limited the pressure of many industrial hydraulic systems for over 30 years to 500 psi. For example, about 90% of the U.S. automobile industry limits their machine tool and automation hydraulic systems to 500 psi. Systems operating above 500 psi generate more heat than the reservoir can dissipate. As a result, the reservoirs overheat and the hydraulic equipment fails unless an auxiliary heat exchanger is added to the power unit. When auxiliary heat exchangers were added to the system the same large reservoir was required because of the time needed for the fluid to de-aerate itself.

The floor space required for these large reservoirs and associated hydraulic power units is two or three times larger than the pump/electric motor floor space requirement. Such elements are normally bolted to the floor. Accordingly, if a power unit stopped for any reason, the machine tool or system was stopped until the power unit was fixed.

Millions of gallons of oil are imported each year to fill these reservoirs and millions of gallons are disposed of each year. Thus, the requirements of the large reservoir also has a negative effect on our nation's balance of payment. Furthermore, disposition of the oil damages the environment.

SUMMARY OF THE PRESENT INVENTION

The present invention provides the hydraulic fluid reservoir with a built-in air-to-fluid maintenance-free heat exchanger which can remove heat 3 to 5 times faster than known reservoirs with 66% less fluid in the reservoir. The present invention also provides an automatic means of de-aerating the fluid in the reservoir.

The reservoir consists of four side walls, a top wall and bottom wall. One or more of the side walls is used to form a heat exchanger channel on its inner side. The selected side wall includes a fan mounted on its outer side to blow cool air onto the outer side thereby dissipating heat that is transferred through the wall. Inside the reservoir are two strategically placed baffles that force the fluid returning to the reservoir to flow through a hot chamber, a heat exchanger chamber and then into a fluid storage chamber where the cooled and de-aerated fluid waits to be drawn out of the reservoir and recirculated by the pump. Any one wall or combination of walls could be converted into a heat exchanger wall by externally mounting a fan and by the placement of the internal baffles.

In the present invention a vertical reservoir is used for illustration of the invention and the back wall where the electric motor is mounted to the reservoir is used as the heat exchanger wall.

The reservoir incorporates a fan that is mounted on the back wall of the reservoir, a heat exchanger channel that is located on the same back wall but is inside the reservoir, and three specifically defined inner chambers which are created by two internal strategically placed baffles. The baffles define the hot return chamber which occupies about 5% of the total reservoir volume, the heat exchanger channel which occupies about 2% of the reservoir volume and the pump suction storage chamber which occupies about 93% of the reservoir volume. In this case the fan is in the electric motor that drives the pump, but an auxiliary fan or one or more additional fans could be added to create or increase the cooling external air jets.

Situated on the inner side of the back wall and parallel thereto is a vertical flow baffle plate. Thus situated, a narrow fluid heat exchanger channel is defined between the vertical baffle and the inner side of the back wall.

Fixed to the lower end of the vertical baffle and situated perpendicularly thereto is a horizontal baffle. The horizontal baffle also abuts the outer two side walls and the front wall of the reservoir, thereby defining a fluid storage chamber below the baffle for the hot and aerated fluid returning to the reservoir and a fluid storage chamber above the baffle where the cooled and de-aerated fluid is stored while it awaits recirculation by the pump. The lower chamber and the upper chambers are isolated but are inter-connected by the heat exchanger channel.

The hot and aerated fluid returning to the reservoir is ported into the lower hot chamber. The hydraulic pressure developed by the returning fluid to the hot chamber forces the hot and aerated fluid in the hot chamber into the heat transfer chamber and accelerates it up to speed. As the fluid flows through the heat exchanger channel, it transfers its heat to the inner back wall and as the fluid flows out of the heat exchanger its upward momentum forces the aerated fluid to the fluid surface. When the air or vapor bubbles in the fluid come in contact with atmosphere pressure they instantly break.

By this design cooled and de-aerated fluid is ported into the upper fluid storage chamber. However, a few bubbles may be reformed by the turbulent flow as the fluid flows out of the exchanger chamber and into the storage chamber. These bubbles float an inch or two to the fluid surface and break just as the bubbles do in known reservoir systems. The hydraulic lifting of the aerated fluid to the fluid surface by forcing all of the returning fluid through the heat exchanger channel eliminates the need for the large reservoir.

The heat sink developed in the heat exchanger channel is developed by the fan in the electric motor and the associated air jets that blow away the outer surface heat. Cooling air molecules, on impact, pick up the heat on the back wall surface and transfer it to the atmosphere. Thus there is no need for a large reservoir wall to radiate the heat away.

The heat exchanger built into the reservoir offers several advantages over prior art reservoirs. Such advantages including abilities to: (1) remove heat 3 to 5 times faster; (2) de-aerate the fluid automatically and instantaneously; (3) operate with 66% less fluid; and (4) reduce the floor space required for the power unit.

The power unit can operate at high pressures and can be made portable because it can be made smaller, lighter and more powerful. Now when a power unit fails it can be changed in a very short time, thus, improving machine up time.

Also, the invented reservoir can improve our nation's balance of payment and improve our environment by reducing the amount of fluid needed by our industrial plants by over 70%.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views, and in which.

DETAILED DESCRIPTION OF THE PREFERRED EMBODIMENT OF THE PRESENT INVENTION

Figure 1:
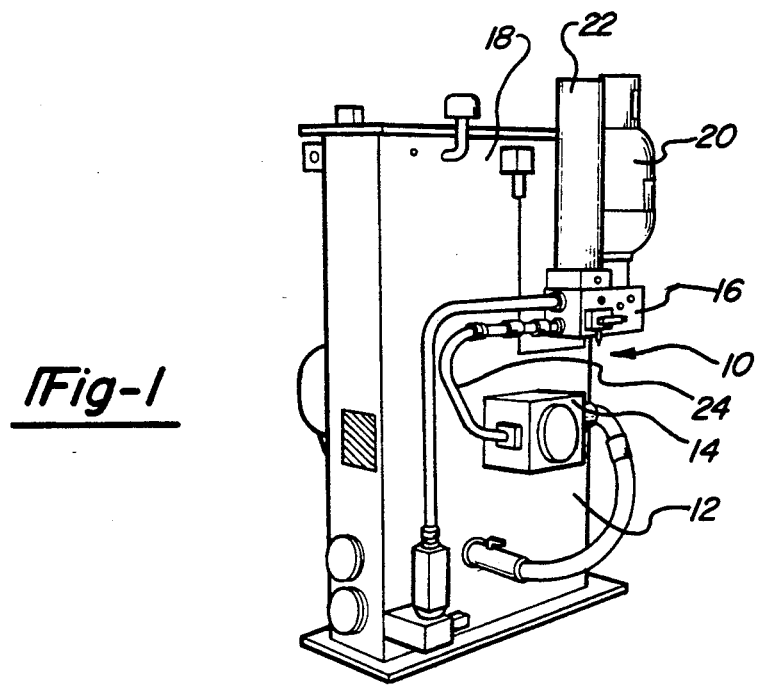
FIG. 1 is a peripheral view of a power unit having provided therein a reservoir cooling system according to the present invention.

The drawing discloses the preferred embodiment of the present invention. While the configuration according to the illustrated embodiment is preferred, it is envisioned that alternate configurations of the present invention may be adopted without deviating from the invention as portrayed. The preferred embodiment is discussed hereafter.

Referring to FIG. 1, a peripheral view of a hydraulic power unit, generally indicated as 10, is illustrated. Of course, the power unit 10 may have configurations or an appearance somewhat different from that portrayed. The illustrated external circuitry has no bearing on the reservoir other than providing a source for fluid circulation and heat to demonstrate the characteristics of the reservoir.

The unit 10 includes a reservoir portion 12. Situated above the reservoir portion 12 on a front wall 18 of the unit 10 is a hydraulic fluid gear pump 14 which is rated at 46 gpm.

A manifold 16 is also provided on the front wall 18 of the unit 10. The manifold 16 includes an internal unloading circuit (not visible). On top of the manifold 16 are situated a fluid accumulator 20 and a fluid filter 22. Again, as with the configuration and appearance of the unit 10, the pump 14, the manifold 16, the fluid accumulator 20, and the fluid filter 22 may be varied in appearance and design and may also be situated elsewhere.

Interconnecting the pump 14 and the manifold 16 is a pressure line 24.

Figure 2:
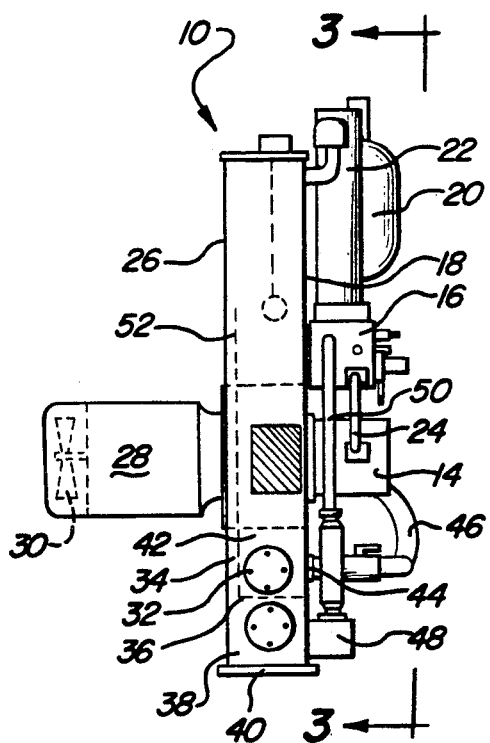
FIG. 2 is an elevated side view in cross section illustrating the internal components in broken lines of the pump of FIG. 1.

Referring to FIG. 2, a raised elevational side view of the unit 10 is illustrated. This view illustrates the internal components in broken lines of the unit 10 as well as the external components discussed above with respect to FIG. 1.

Still referring to FIG. 2, a back wall 26 of the unit 10 has fitted thereon an electric motor 28. The motor 28 drives a fan 30 shown in broken lines which blows air against the back wall 26 of the reservoir.

Situated within the unit 10 is the heart of the present invention, a vertical fluid flow baffle plate 32. The plate 32 extends from side wall to side wall. Between the inner side of the back wall 26 and the baffle plate 32 is defined a fluid flow heat exchanger channel 34 through which hydraulic fluid upwardly flows as will be described subsequently.

Perpendicularly provided at the lower end of the vertical baffle 32 is a horizontal baffle 36. The horizontal baffle 36 is provided horizontally relative to a floor 40. The horizontal baffle 36 extends from vertical baffle 32 to both side walls and to the inner side of the front wall 18. This construction defines a hot fluid reservoir 38 situated below the horizontal baffle 36 and a fluid storage reservoir 42 situated above the baffle 36.

A reservoir suction port 44 is fitted to the front wall 18 of the unit 10 and is fluidly interconnected between the storage reservoir 42 and the pump 14 by a hose 46.

A return port 48 is also fitted to the front wall 18 of the unit 10 and is fluidly interconnected between the hot fluid reservoir 38 and the manifold 16 by a fluid return line 50.

Heated and aerated fluid returning to the hot fluid chamber 38 through the port 48 is forced under the horizontal baffle 36 into the channel 34. The fluid (not shown) travels upwardly along the channel 34 (through the heat exchanger) and discharges over the upper edge 52 of the vertical baffle 32 into the storage chamber 42. While the heated and aerated fluid passes upwardly in the channel 34 between the baffle 32 and the back wall 26, the back wall 26 acts as a heat sink and draws heat from the hot fluid. The back wall 26 is thereafter cooled by the fan 30 in the motor 28. The air jets developed by the motor fan 38 imping on the back wall 26, pick up the outer surface heat transferred through the back wall 26 and transfer it to the atmosphere.

Once the cooled fluid is in the storage reservoir 42, the fluid is drawn through the port 44 and the hose 46 to the pump 14 and then pumped through the hose 24 to the manifold 16. Thereafter it is used to work as required, is thereby reheated, and is recirculated according to the process described above. A fluid level switch mechanism 54 may be provided to check fluid level in the reservoir 42.

When the cooled fluid leaves the heat exchanger chamber 34, it still may contain air and/or vapor bubbles. The upward momentum of the aerated fluid as it flows out of the heat exchanger 34 causes it to continue to flow up to the fluid surface level in the storage chamber 42. When the bubbles in the aerated fluid are exposed to atmospheric pressure they instantaneously break just as they did in the prior art systems, but now the aerated fluid is hydraulically lifted to the fluid surface by forcing it through the heat exchanger chamber 34.

Figure 3:
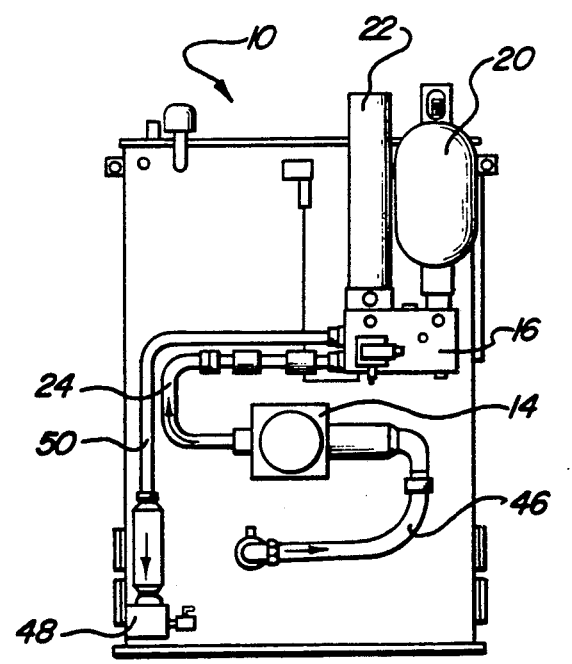
FIG. 3 is a view taken along lines 3—3 of FIG. 2.

FIG. 3 illustrates a front view of the unit 10 taken along lines 3—3 of FIG. 2. This view well illustrates the external components of the unit 10 and further illustrates the path of fluid flow as shown by arrows.

It is important to note that the cooling capacity of the air to fluid cooling system is not a function of the size of the reservoirs 38, 42 nor the ratio between the capacity of the pump 14 and the overall capacity of the reservoir 12. Instead, the cooling capacity is determined by the amount of air being forced against the outer surface of the back wall 26, the thermal conductivity of the back wall 26 material. Also determinitive is the ratio of the fluid surface contact area of the inner side of the back wall 26 to channel separation and fluid velocity in the heat transfer channel.

For example, a system comprising a fifty gallon reservoir with a three-sixteenths' inch steel back wall and a three-eighths' channel separation with a 46 gpm gear pump and a standard 1800 rpm electric motor removes seven thermal horsepower of heat; a 60 gallon prior art reservoir removes 1.2 horsepower of thermal heat. Conversely, a system comprising a ten gallon reservoir with a 0.06 copper external back wall and a quarter inch heat exchanger channel separation with a ten gpm pump and a 1200 rpm electric motor having an over-sized fan fitted thereto removes three-and-one-quarter thermal horsepower of heat continuously; a 10 gallon prior art reservoir removes 0.3 thermal horsepower of heat.

Having described my invention, however, many modifications thereto will become apparent to those skilled in the art to which it pertains without deviation from the spirit of the invention as defined by the scope of the appended claims.

I claim:

1. A hydraulic reservoir comprising:
   a bottom wall, opposed front and rear walls and a pair of opposed side walls interconnecting said front and rear walls, each of said walls having an inner surface defining a reservoir tank and an outer surface;
   a vertical baffle plate adjacent and parallel to the inner surface of said rear wall and connected to the inner surface of said side walls with an upper and lower end within said tank, said lower end being spaced from said bottom whereby a heat exchange channel is formed between said baffle plate and the inner surface of said rear wall to cool fluid as it passes therethrough;
   a horizontal baffle plate connected to the lower end of said vertical baffle plate and the inner surfaces of said front and side walls dividing said tank into a lower hot fluid chamber and an upper cool fluid storage chamber interconnected by said heat exchange channel; and
   a fan connected to the outer surface of said rear wall directing cooling air jets in a direction toward and perpendicular to the outer surface of said rear wall to impinge against a substantial portion of said rear wall which forms said heat exchange channel to convectively transfer heat to the atmosphere;
   wherein as hot aerated fluid is delivered to said lower chamber, it is forced upwardly through said heat exchange channel, cooling the fluid, and aerated bubbles are broken as the fluid passes over the upper end of the vertical baffle plate into said upper storage chamber.

2. A hydraulic reservoir according to claim 1 wherein said rear wall is a heat sink drawing heat from said fluid.

3. A hydraulic fluid reservoir according to claim 1 wherein said heat exchange channel extends along a major portion of said rear wall.

* * * * *